United States Patent
Gaynor (10) Patent No.: US 8,070,634 B2
(45) Date of Patent: Dec. 6, 2011

(54) SYNCHRONOUS BELT SPROCKET

(75) Inventor: John C. Gaynor, Centennial, CO (US)

(73) Assignee: The Gates Corporation, Denver, CO (US)

( * ) Notice: Subject to any disclaimer, the term of this patent is extended or adjusted under 35 U.S.C. 154(b) by 595 days.

(21) Appl. No.: 12/151,016

(22) Filed: May 2, 2008

(65) Prior Publication Data

US 2009/0275433 A1  Nov. 5, 2009

(51) Int. Cl.
 *F16H 7/00* (2006.01)
(52) U.S. Cl. .................................. 474/153; 474/205
(58) Field of Classification Search ............ 474/153, 474/204, 205, 250
 See application file for complete search history.

(56) References Cited

U.S. PATENT DOCUMENTS

| | | | |
|---|---|---|---|
| 3,756,091 A | 9/1973 | Miller | 74/231 C |
| 4,337,056 A | 6/1982 | Bruns | |
| 4,403,979 A * | 9/1983 | Wujick | 474/153 |
| 4,515,577 A * | 5/1985 | Cathey et al. | 474/204 |
| 4,605,389 A | 8/1986 | Westhoff | 474/153 |
| 4,650,443 A | 3/1987 | Wetzel | 474/153 |
| 4,840,608 A | 6/1989 | Araki et al. | 474/205 |
| 4,993,998 A * | 2/1991 | Tanaka et al. | 474/205 |
| 5,015,218 A * | 5/1991 | Macchiarulo et al. | 474/152 |

FOREIGN PATENT DOCUMENTS

| | | |
|---|---|---|
| AU | 451 700 B2 | 7/1974 |
| EP | 0 106 694 A | 4/1984 |
| EP | 0 505 919 A | 9/1992 |
| FR | 2 796 692 | 1/2001 |

* cited by examiner

*Primary Examiner* — Sang Kim
(74) *Attorney, Agent, or Firm* — J. A. Thurnau, Esq.; P. N. Dunlap, Esq.; T. A. Dougherty, Esq.

(57) ABSTRACT

A sprocket comprising at least one groove for engaging a toothed belt, said groove having a flank, the flank having a groove tip radii (R1) of between approximately 105% and approximately 125% of a belt tooth root radii (R8) when the toothed belt is in rack form, said groove tip radii being joined to a groove arcuate conjugate flank portion (200) by a linear flank portion (202), and said linear flank portion being disposed at an angle (Φ) of between approximately 18° to approximately 24° with respect to a groove centerline (CL) and comprising a length of at least approximately 20% of a sprocket groove depth (h).

3 Claims, 7 Drawing Sheets

| | | CENTER POINTS | |
|---|---|---|---|
| | RADIUS | X | Y |
| R0 | 2.752 | 0.000 | -2.752 |
| R1 | 0.056 | (-0.232) | (-0.066) |
| R2 | 0.438 | ( 0.253) | ( 0.043) |
| R3 | 0.212 | ( 0.052) | (-0.059) |
| R4 | 0.074 | (-0.044) | (-0.160) |
| R5 | 0.578 | ( 0.000) | ( 0.343) |

| | SEGMENT INTERSECTIONS | |
|---|---|---|
| | X | Y |
| P1 | -0.236 | -0.010 |
| P2 | -0.178 | -0.048 |
| P3 | -0.160 | -0.103 |
| P4 | -0.137 | -0.157 |
| P5 | -0.097 | -0.211 |
| P6 | -0.055 | -0.233 |
| P7 | -0.006 | -0.235 |
| P8 | 0.000 | -0.235 |

SYNCHRONOUS BELT SPROCKET

FIELD OF THE INVENTION

The invention relates to a synchronous belt sprocket and more particularly, to a synchronous belt sprocket comprising a groove tip radii being joined to a groove arcuate conjugate flank portion by a linear flank portion.

BACKGROUND OF THE INVENTION

Synchronous belt drive systems are used extensively in industry as substitutes for chain drives or gear trains to transmit torque and/or translate motion between shafts.

Belt drives have a pitch line that is displaced from both the belt and the sprocket teeth and is located within the belt tensile member. The displaced pitch line introduces the problem of assuring good entry of a belt tooth into a sprocket groove with a minimum of interference at various belt loads and sprocket diameters.

The belt tooth/sprocket tooth interference problem is further compounded by belt manufacturing and sprocket manufacturing tolerances that result in small pitch differences between the belt teeth and sprocket teeth, tooling tolerances that result in small differences between the sprocket tooth and belt tooth flank profiles, polymer shrinkage during the molding process which results in a less than ideal belt tooth form, rotation and deflection of the belt teeth under load resulting in entry and exit belt tooth/sprocket tooth interference, and a chordal effect caused by differences in the sprocket groove depth/belt tooth height resulting in an apparent pitch difference between the belt teeth and sprocket teeth.

This pitch mismatch between the belt teeth and the sprocket teeth results in the upper portion of the pulley tooth, particularly the zone where the sprocket tip radii intersect with the curvilinear sprocket flanks, scrubbing the upper portion of the belt tooth flanks eventually weakening the belt tooth covering resulting in belt tooth failure.

Representative of the art is U.S. Pat. No. 4,605,389 which discloses a toothed power transmission belt with belt teeth having flank surfaces in the form of a tractrix curve and a belt sprocket with sprocket teeth having flank surfaces in the form of a tractrix curve, together, the belt and sprocket exhibiting smooth running and antiratcheting characteristics.

What is needed is a sprocket having a groove tip radii being joined to a groove arcuate conjugate flank portion by a linear flank portion. The present invention meets this need.

SUMMARY OF THE INVENTION

The primary aspect of the invention is to provide a sprocket having a groove tip radii being joined to a groove arcuate conjugate flank portion by a linear flank portion.

Other aspects of the invention will be pointed out or made obvious by the following description of the invention and the accompanying drawings.

The invention comprises a sprocket comprising at least one groove for engaging a toothed belt, said groove having a flank, the flank having a groove tip radii ($R1$) of between approximately 105% and approximately 125% of a belt tooth root radii ($R8$) when the toothed belt is in rack form, said groove tip radii being joined to a groove arcuate conjugate flank portion (200) by a linear flank portion (202), and said linear flank portion being disposed at an angle ($\Phi$) of between approximately 18° to approximately 24° with respect to a groove centerline (CL) and comprising a length of at least approximately 20% of a sprocket groove depth (h).

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
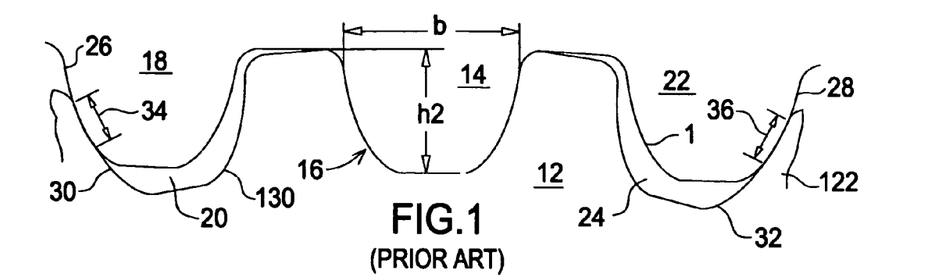
FIG. 1 is a cross-sectional view of a prior art belt and sprocket meshing engagement.

FIG. 1 is a cross-sectional view of a prior art belt and sprocket meshing engagement. The outline of a prior art toothed belt having a tooth height ($h2$) to tooth base width ($b$) ratio of about 0.70 meshes a segment of a 32 tooth prior art sprocket 12 to illustrate how the meshing characteristics of the belt depends on the shape of its flank surfaces. While there is no interference fit between a belt tooth 14 that is fully engaged in a sprocket cavity 16, the belt tooth 18 entering the sprocket groove 20 and belt tooth 22 leaving the sprocket groove 24 have flank surfaces 26, 28 that are so "steep" that they scrub against the upper portions of the sides of the sprocket groove flank 30, 32 as is illustrated by the overlapped areas 34, 36. The scrubbing between the tooth flank and the groove flank causes noise and may induce unwanted belt vibration during belt operation. If the distance between the sprocket flanks is narrowed for the purpose of facilitating tooth entry and exit without interference, as for example, by removing tooth material from the overlapped areas 34, 36, each belt tooth would merely translate to a position against the sprocket groove flank where there would again be belt tooth interference.

Figure 2:
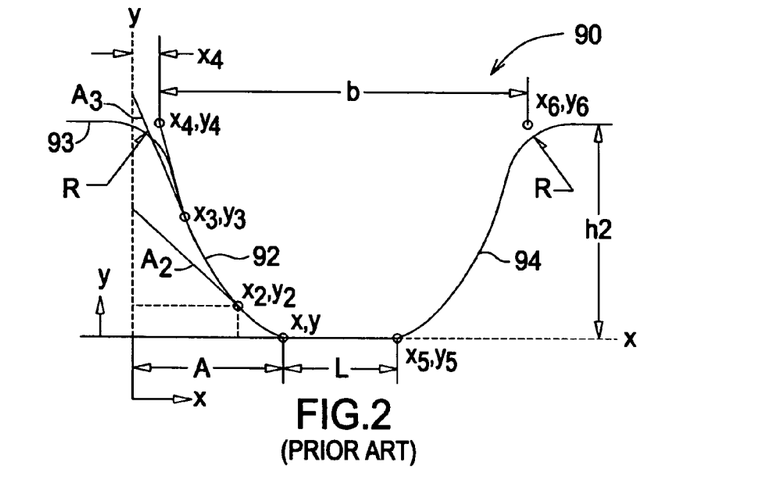
FIG. 2 is a cross-sectional view of a prior art groove profile.

FIG. 2 is illustrates the formation of tractrix curves 92, 94 as used to generate the profiles of a prior art toothed belt tooth flank surface when the belt teeth are in rack form.

Generally, a tractrix curve is defined as the involute of a catenary. A characteristic of a tractrix curve is that a portion of a tangent remains a constant length between its point of contact on the curve and a rectangular coordinate axis. The direction of all the tangents substantially approximates the relative direction of movement of a belt tooth as it enters a sprocket groove without interfering with a sprocket tooth.

The shape of the tractrix curve 92 for a prior art tooth flank or groove flank can be expressed in rectangular coordinates with the following equation:

$$y = A[\ln(A/x + \sqrt{(A/x)^2 - 1}) - \sqrt{1 - (x/A)^2}]$$

where:
the y axis is perpendicular to the belt's longitudinal axis;
the x axis is parallel to the belt's longitudinal axis;
y=the y axis coordinate;
x=the x axis coordinate; and
A=that portion of a tangent that is a constant between a point on the tractrix curve and the y axis.

The tractrix curve 92 starts at a point (x, y) which corresponds to a point on a belt tooth tip. In the figure, a point x is located a distance A from the y axis where a line A also represents a tangent to the curve at point (x, y). At point (x2, y2), tangent A2 is equal in length to segment A. As the curve 92 continues, tangent A3 at point (x3, y3) is equal in length to tangent A2 and segment A. The curve 92 continues as shown extends as a dotted line to the point (x4, y4) which is on a projection of line 93. Line 93 corresponds to the y-axis coordinate for the location of a belt tooth land surface. The point (x4, y4) is located a distance h2 from the x axis which corresponds to the height of a belt tooth. The curve 92 blends into the line 93 by means of a radius R.

The tractrix curve 94 is generated in a similar manner starting at point (x5, y5) which is spaced a distance L from point (x, y). The curve 94 continues to be generated to the point (x6, y6) which is spaced a distance b from the point (x4, y4). The distance b establishes the base width of a belt tooth.

Figure 3:
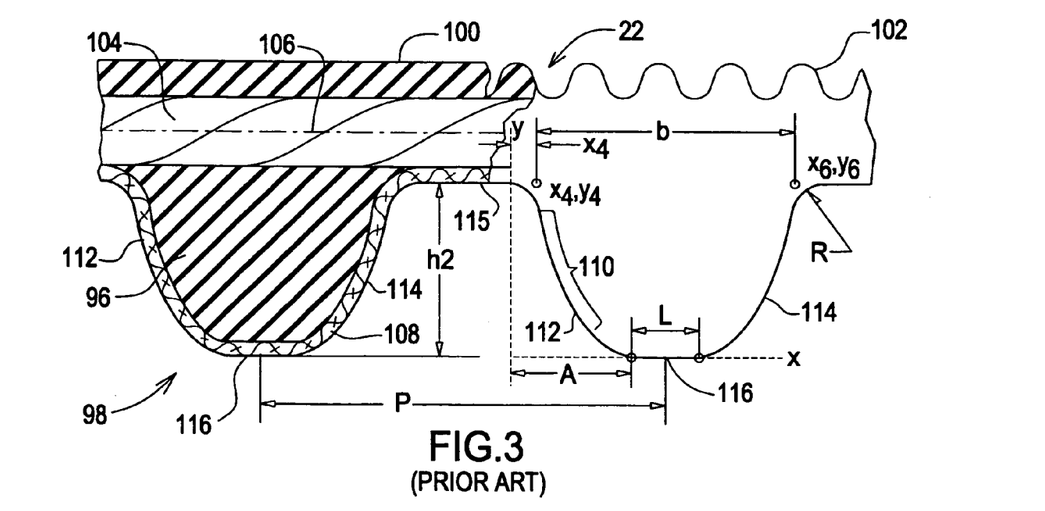
FIG. 3 is a cross-sectional view of a prior art belt construction.

FIG. 3 is a cross-sectional view of a prior art belt construction. A typical prior art toothed belt comprises an elastomeric body 96 that on one side comprises a plurality of belt teeth 98, and on the other side forms a back-layer of any desired shape such as smooth 100 or corrugated 102. The body is molded or cast in known fashion using any suitable elastomer such as natural rubbers, synthetic rubbers, or blends thereof; or the castable elastomers such as polyurethane.

A tensile member 104 is disposed in the body and defines a pitch line 106 or longitudinal axis around which bending of the belt takes place during operation. The tensile member may be made of any suitable high-modulus material such as spiralled steel cable, fiber glass cord, aramid fiber such as sold under the trademark Kevlar or Kevlar 49, or the like. Carbon fiber cord may also be used for tensile member 104.

Fiberous material known in the art may optionally be disposed in the belt teeth to enhance their modulus, and optionally, a wear resistant fabric 108 may be disposed as a tooth facing.

Each prior art belt tooth has at least that major part 110 of its flank surfaces 112, 114 substantially in the form of a tractrix curve that is generated in the manner as described in conjunction with FIG. 2 while the belt teeth are in rack form. The tractrix curve blends into a land surface 115 by means of a radius R. Similarly, a radius or a continuation of the tractrix curve is used to blend into the belt tooth tips 116, which may have a length L.

The belt teeth are spaced by a pitch P and each have a base b and a height h2, as viewed in longitudinal section. The steepness of the flank surfaces has an effect on ratcheting and is controlled by the ratio A/h2. The ratio of A/h2 is from approximately 0.55 to 0.90.

The depth of the belt tooth, which also has an effect on ratcheting, is controlled by the ratio of h/b. The ratio of h/b is from approximately 0.30 to 1.0.

The ratio b/P is partially used to reduce overlapping interference between a belt tooth and a sprocket during entry or exit. The ratio of b/P is from approximately 0.80 to 0.35.

For each of the disclosed ratios the quantity b/2 is always greater than the quantity (A−x4) to avoid the tractrix curves 92, 94 from theoretically overlapping each other.

The description herein of the belt tooth flank surfaces is for the condition where the belt teeth are in "rack form", that is, when the y axis is perpendicular to the pitch line, i.e., the belt is flat as though pressed upon a flat surface. When the belt bends such as when it tracks on a sprocket, the y axis is no longer perpendicular to the pitch line because it remains in a fixed relationship to the belt tooth.

In accordance with this invention, the sprocket groove flank 200 is designed conjugate to the belt teeth previously described, and are separated by the developed conjugate width plus any desired belt tooth width to sprocket groove width clearance. The inventive sprocket groove bottom may be slightly convex, slightly concave or flat, the form of which is not important to the proper operation of this invention. The sprocket groove depth ("h" see FIG. 4) as measured along the centerline of the sprocket groove from the outside diameter (OD1) to the bottom of the sprocket groove is from approximately 2% less than to approximately 4% greater than the belt tooth height (h2) as measured from the belt land line to the belt tooth tip, see FIG. 3.

The linear portion of the sprocket groove flanks (202) comprise a length of between approximately 20% to approximately 50% of the sprocket groove depth (h). Each flank portion 202 is disposed at an angle (Φ) of between approximately 18° and approximately 24° with the sprocket groove centerline (CL). The angle D in the noted range is dependent upon the sprocket pitch (P), sprocket outside diameter (OD1) and the degree of ratchet resistance desired. Generally steeper flanks provide a system with greater ratchet resistance but are less forgiving of meshing interference.

The sprocket tip radius (R1 see FIG. 7) is in the range of approximately 105% to approximately 125% of the belt root radii (R8 see FIG. 5) when the belt is in rack form.

This combination of design parameters results in a sprocket groove that has a "funneling" effect which guides a belt tooth into position as it enters and exits the sprocket groove without placing undue localized shear loads on the belt tooth flank. This results in significantly longer belt life and better distributes tooth shear loads to minimize the chordal action and belt tooth rotation.

Figure 4:
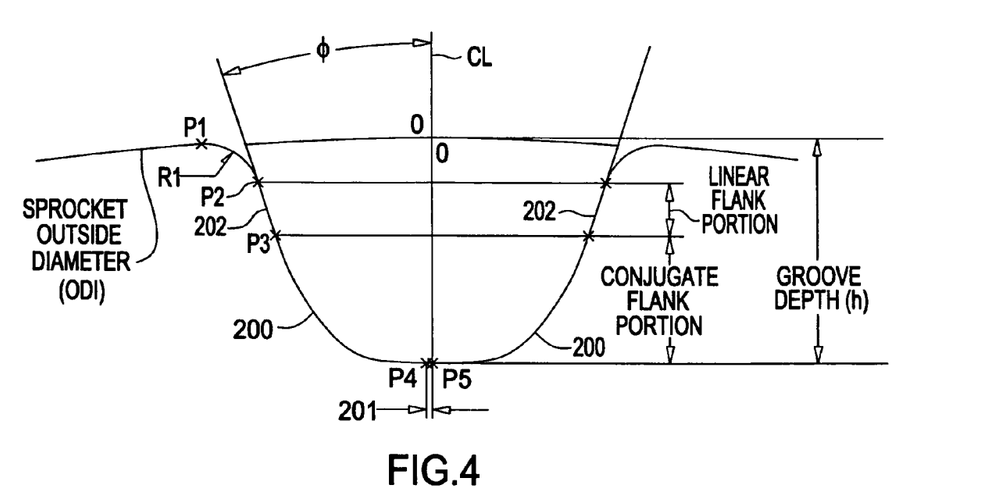
FIG. 4 is a cross-sectional view of an inventive sprocket groove.

FIG. 4 is a cross-sectional view of an inventive sprocket groove. In this case the portion of the groove arcuate flank 200 from P3 through P4 is conjugate to the belt tooth flank 114 described herein and offset from the centerline CL by the desired sprocket groove to belt tooth clearance 201, namely P4 to P5. Section 201 is located at a depth equal to the groove depth (h).

Figure 7:
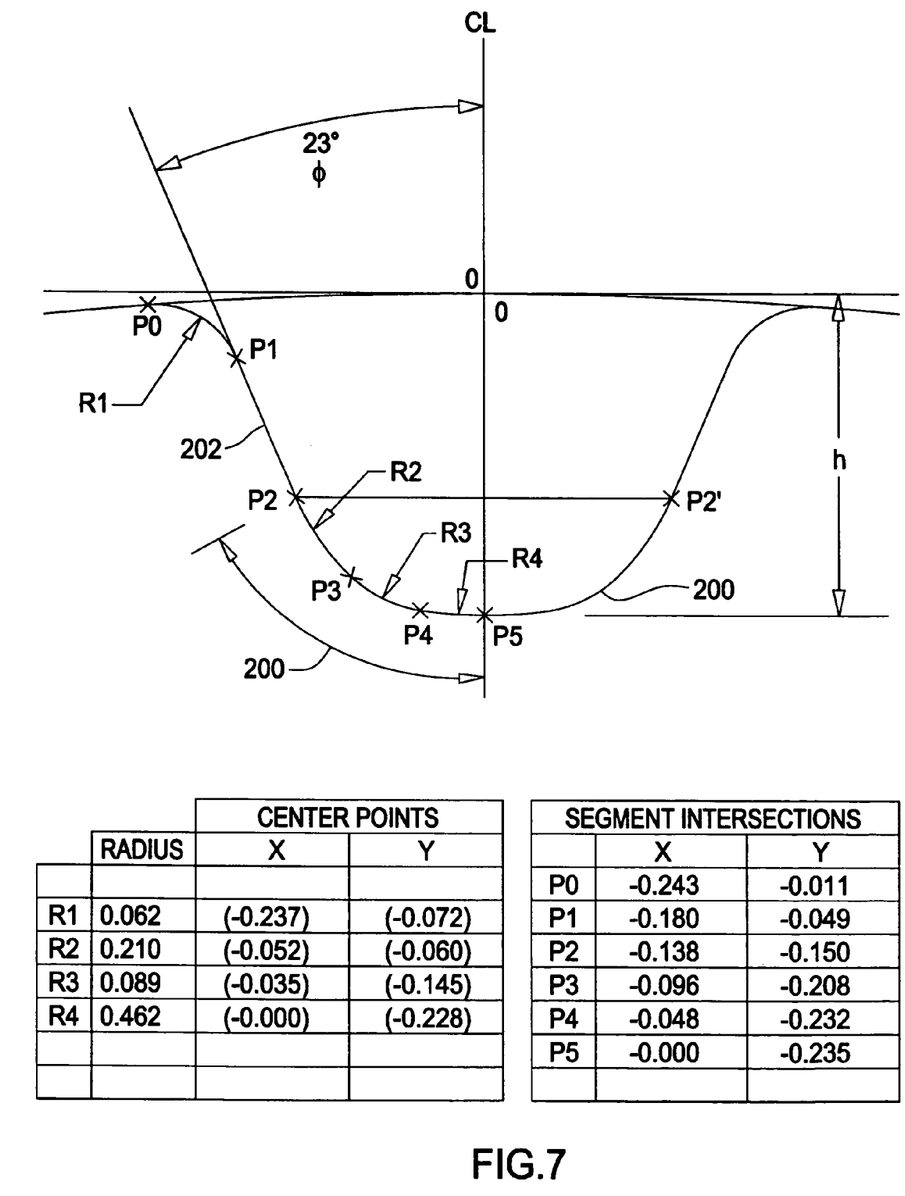
FIG. 7 is a cross-sectional view of an inventive sprocket groove with dimensions.

Flank section 200 comprises radii R2 and R3, see FIG. 7. Radii R2 and R3 may be equal (R2=R3) or not equal (R2≠R3).

The linear portion 202 of the flank is disposed at an angle Φ to the sprocket groove centerline CL, which portion 202 extends tangentially outward from the lower sprocket groove arcuate flank at point P3. A sprocket tip radius (R1), which is greater than the belt tooth root radius (R8) in rack form, extends from a tangent to the linear sprocket groove flank portion at point P2 to the sprocket outside diameter OD1.

Figure 5:
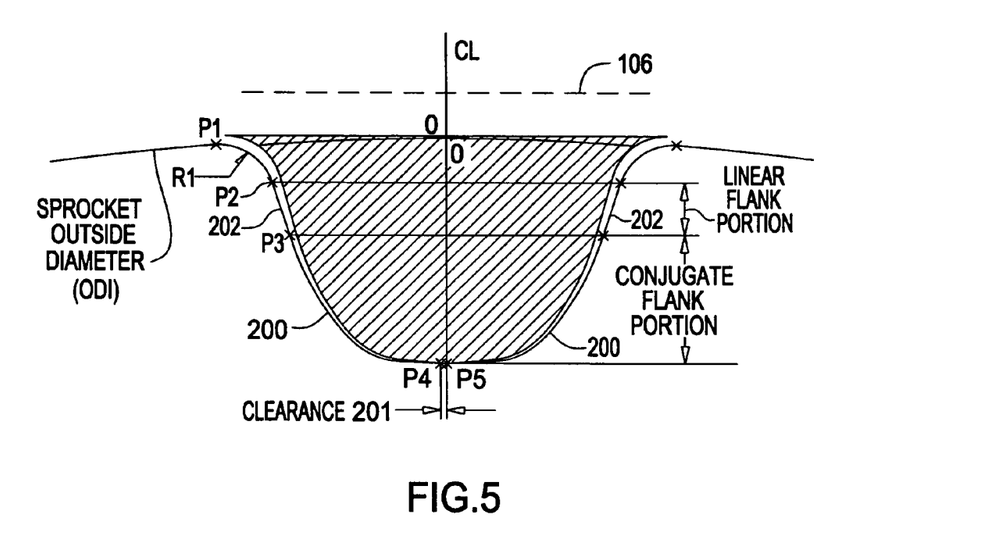
FIG. 5 is a cross-sectional view of a belt tooth engaged with an inventive sprocket groove.

FIG. 5 shows a 14 mm pitch prior art belt tooth in rack form engaged with a 32 groove 14 mm sprocket of the current invention. The groove is somewhat oversize compared to the belt tooth. In rack form pitch line 106 is linear.

Figure 6:
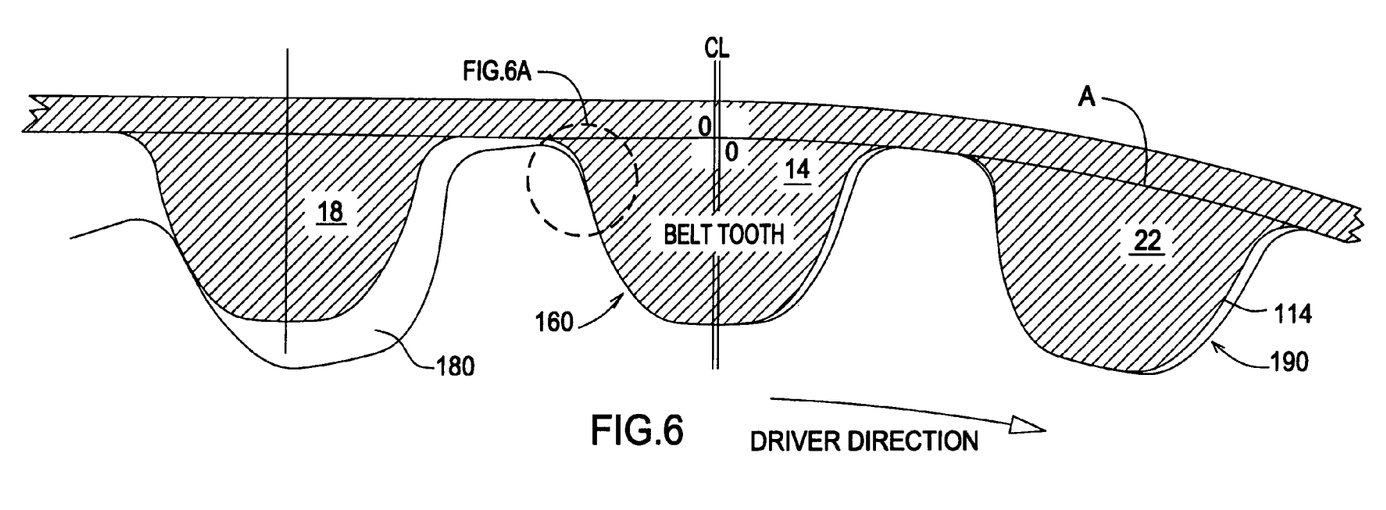
FIG. 6 is a cross-sectional view of a belt meshing with an inventive sprocket.
Figure 6A:
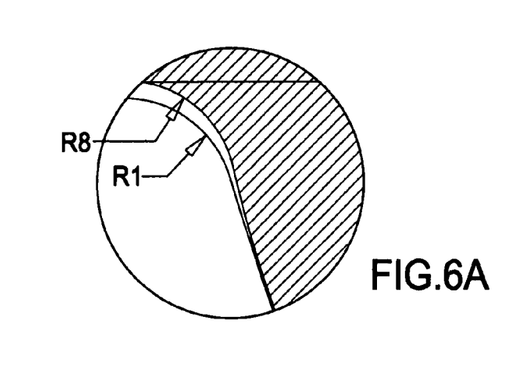
FIG. 6A is a detail of FIG. 6.

FIG. 6 illustrates a prior art belt meshing with a sprocket of the present invention. Each tooth 14, 18, 22 meshes with a groove 160, 180, 190 respectively. This figure shows the clearance between the belt tooth upper flank 114 and root radius R8 see FIGS. 5 and 7 and the sprocket groove upper flank 202 and tip radius R1 (see FIG. 5). This can be contrasted with the prior art belt tooth and sprocket groove engagement shown in FIG. 1 where no such clearances exist. FIG. 6A is a detail of FIG. 6.

FIG. 7 an embodiment of the present invention. A 14 mm pitch sprocket of 32 grooves is described. In this case, the sprocket groove depth (h) is chosen to be equal to the belt tooth height (h2) of approximately 0.23" The lower conjugate portion of the sprocket groove 200 makes up approximately 36.2% of the total groove depth (h). Portion 200 is shown here as a combination of radii, R2 and R3, for illustrative purposes, but may also comprise a tractrix curve or some other curvilinear combination that approximates the conjugate of the belt tooth. The numerical values are examples only and are not intended to limit the scope of the invention.

The lower flank width of the sprocket groove measured between points P2 and P2' is equal to the belt tooth conjugate width plus a design clearance (201) of approximately 0.01 inches. A groove bottom portion, R4, may be slightly concave, but typically approximates a straight line. The linear upper flank portion 202 extends from point P2 to P1 making an angle of approximately 23° with the sprocket groove centerline. Portion 202 comprises a total length of approximately 43% of the sprocket groove depth (h) measured along the sprocket groove centerline (CL). A sprocket groove tip has a radius R1 of approximately 0.06 inches. R1 engages a tangent to the sprocket outside diameter at point P0 and a tangent to the linear sprocket groove upper flank portion at point P1. Radius R1 is approximately 124% of the belt tooth root radius (R8) in rack form. The numerical examples are offered only to illustrate and are not intended to limit the scope of the invention.

In this FIG. 7 the segment between P4 and P5 comprises a slight radius which results in a slightly concave bottom for the groove. The curve may also be slightly convex. In FIG. 4 the segment is linear. Therefore, segment P4 to P5 may be curved or linear without adversely affecting the invention. In this embodiment flank portion 200 comprises radii R2, R3, R4.

Figure 8:
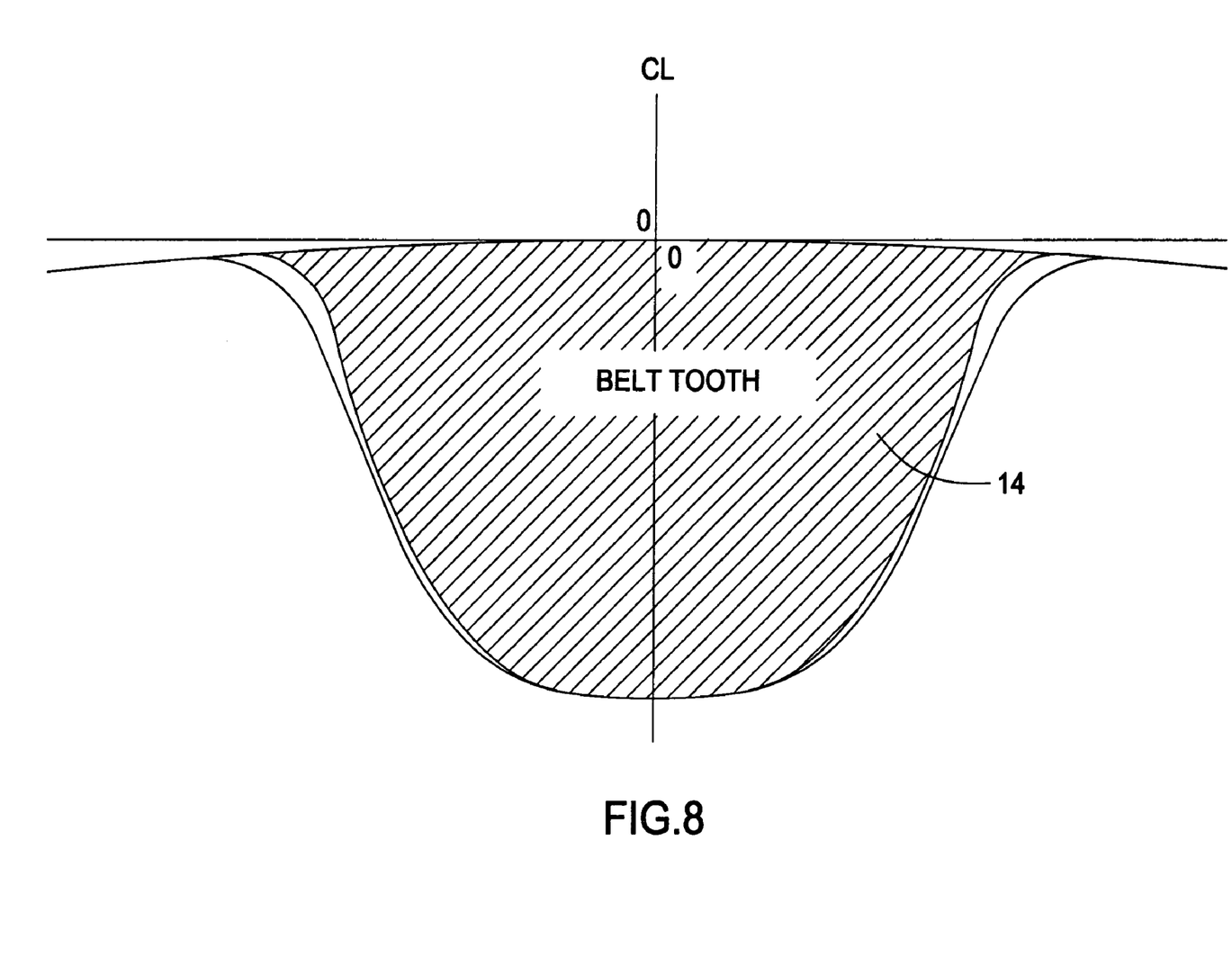
FIG. 8 shows the outline of the belt tooth engaged with the sprocket groove profile of FIG. 7.

FIG. 8 shows the outline of the belt tooth engaged with the sprocket groove profile of FIG. 7.

A significant degree of improvement of the inventive system over the prior art, as illustrated by the results in the following Table 1, was achieved. Prior art belts were tested on 32 groove 14 mm pitch prior art sprockets as well as the 32 groove 14 mm inventive sprockets using the designs described in FIGS. 7 and 9 and a known industry standard test. The following are the results of the test program:

TABLE 1

Hours to Belt Failure

Figure 9:
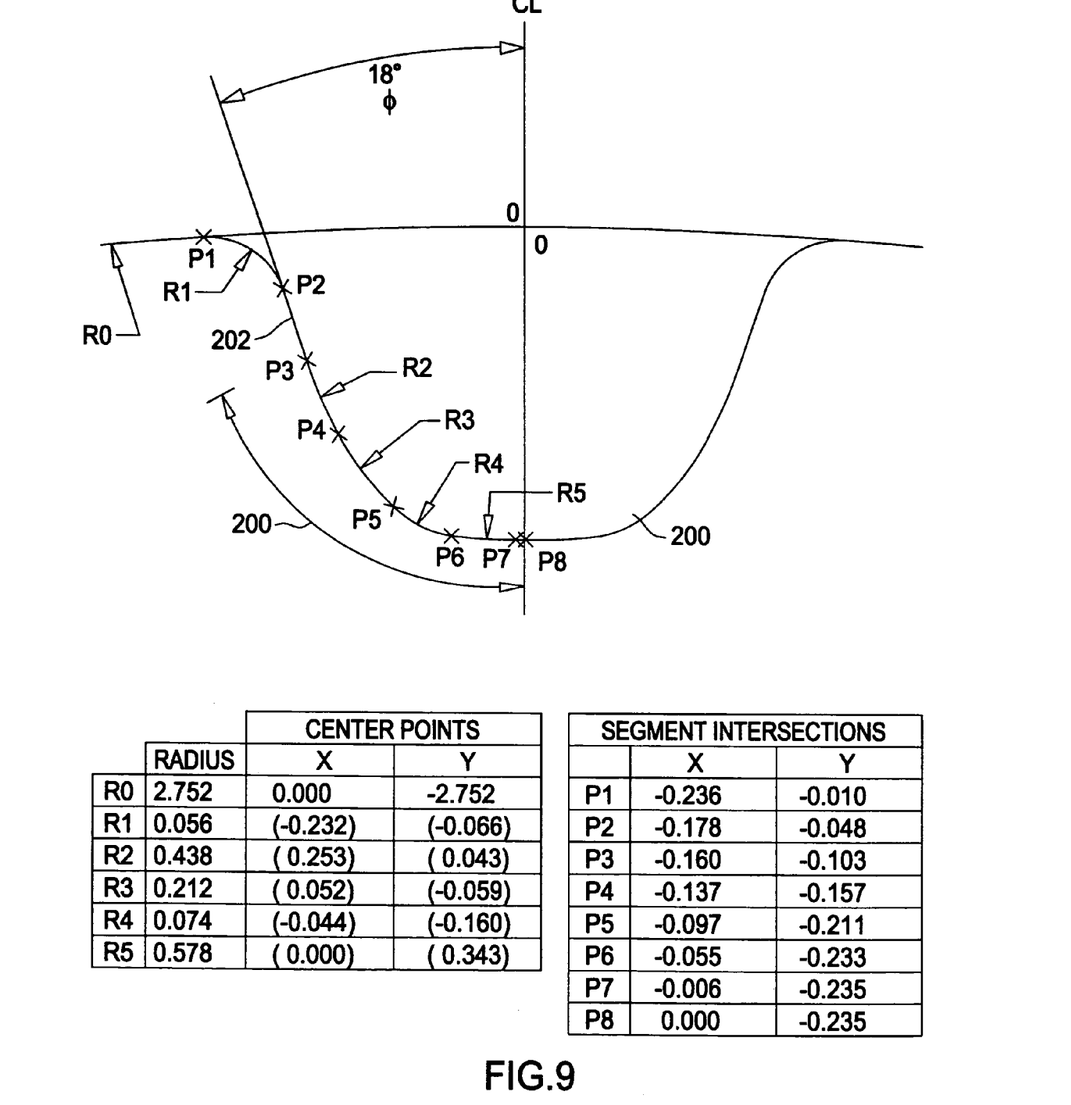
FIG. 9 is a cross-sectional view of an inventive sprocket groove with dimensions.

| Sprocket Type | Test #1 | Test #2 | Angle Φ |
|---|---|---|---|
| Prior art profile | (Not tested) | 218 hours | Curved |
| FIG. 7 profile | 598 hours | (Not tested) | ~23° |
| FIG. 9 profile | 151 hours | 363 hours | ~18° |

FIG. 9 is a cross-sectional view of an inventive sprocket groove with dimensions. The dimensions are only provided as an example and are not intended to limit the scope of the invention. In this embodiment flank portion 200 comprises radii R2, R3, R4, R5 with the upper flank portion 202 having an angle Φ of 18°.

Figure 10:
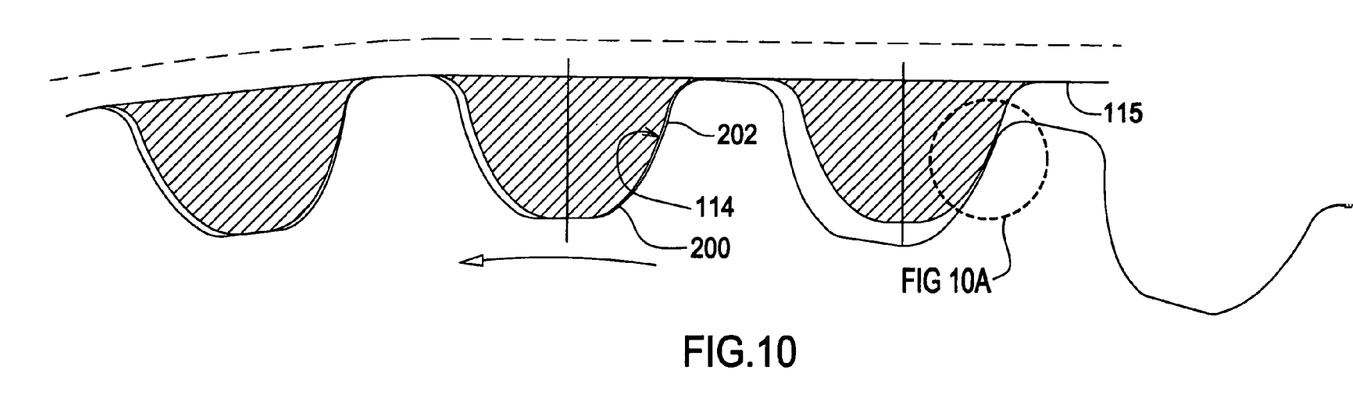
FIG. 10 is a diagram comparing the tooth load distribution between a prior art belt and a prior art sprocket and an inventive sprocket.
Figure 10A:
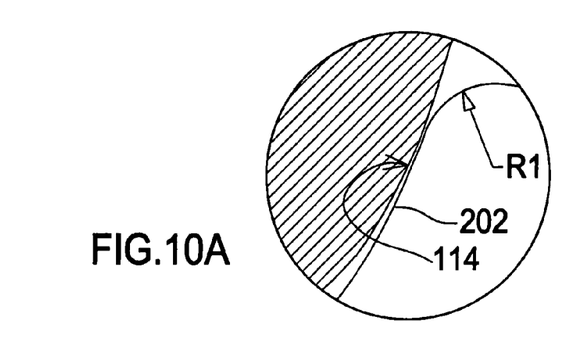

FIG. 10 is a diagram comparing the tooth load distribution between a prior art belt and a prior art sprocket and an inventive sprocket.

Regarding the engagement between a prior art belt and a prior art sprocket, a shear load is primarily concentrated at the tooth root (approximately along R8) intersecting with land surface 115. This can result in cracking at the tooth root. Root cracks ultimately cause belt failure.

In the case of the engagement between a prior art belt and the inventive sprocket, the use of the linear flank portion 202 causes the shear load to be transferred to the belt tooth along substantially all of the tooth flank 114. This avoids concentrating the shear forces at a tooth root, thereby significantly increasing the operating life of the belt.

Although a form of the invention has been described herein, it will be obvious to those skilled in the art that variations may be made in the construction and relation of parts without departing from the spirit and scope of the invention described herein.

I claim:

1. A sprocket comprising:
   at least one groove for engaging a toothed belt;
   said groove having a flank, the flank having a groove radii (R1) of between approximately 105% and approximately 125% of a belt tooth root radii (R8) when the toothed belt is in rack form;
   said groove radii being joined to a groove arcuate conjugate flank portion (200) by a linear flank portion (202);
   said groove arcuate conjugate flank portion (200) extending from said linear flank portion (202) to a sprocket groove centerline (CL); and
   said linear flank portion being disposed at an angle (Φ) of between approximately 18° to approximately 24° with respect to a groove centerline (CL) and comprising a length of at least approximately 20% of a sprocket groove depth (h).

2. The sprocket as in claim 1, wherein:
   the sprocket groove depth (h) is in the range of approximately 2% less than to approximately 4% greater than a toothed belt tooth height (h2).

3. The sprocket as in claim 1, wherein:
   the linear flank portion (202) having a length of less than approximately 50% of the sprocket groove depth (h) as measured on the groove centerline (CL).

* * * * *